(12) United States Patent
Banker et al.

(10) Patent No.: US 11,661,914 B2
(45) Date of Patent: May 30, 2023

(54) METHODS AND SYSTEM FOR STARTING AN ENGINE

(71) Applicant: Ford Global Technologies, LLC, Dearborn, MI (US)

(72) Inventors: Adam Banker, Canton, MI (US); Jeffrey Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 17/303,763

(22) Filed: Jun. 7, 2021

(65) Prior Publication Data
US 2022/0389895 A1 Dec. 8, 2022

(51) Int. Cl.
| | |
|---|---|
| *F02N 11/00* | (2006.01) |
| *B60W 10/02* | (2006.01) |
| *B60W 20/00* | (2016.01) |
| *B60W 10/06* | (2006.01) |
| *B60W 10/08* | (2006.01) |
| *B60W 20/40* | (2016.01) |
| *F02N 11/04* | (2006.01) |

(52) U.S. Cl.
CPC .......... *F02N 11/006* (2013.01); *B60W 10/02* (2013.01); *B60W 10/06* (2013.01); *B60W 10/08* (2013.01); *B60W 20/00* (2013.01); *B60W 20/40* (2013.01); *F02N 11/04* (2013.01); *F02N 2200/021* (2013.01); *F02N 2200/042* (2013.01); *F02N 2200/045* (2013.01); *F02N 2200/046* (2013.01); *F02N 2300/2002* (2013.01)

(58) Field of Classification Search
CPC .................. F02N 11/006; F02N 11/04; F02N 2200/021; F02N 2200/042; F02N 2200/045; F02N 2200/046; B60W 10/02; B60W 10/06; B60W 10/08; B60W 20/00; B60W 20/40
See application file for complete search history.

(56) References Cited

U.S. PATENT DOCUMENTS

| | | | |
|---|---|---|---|
| 6,018,198 A * | 1/2000 | Tsuzuki ................ | B60W 10/08 903/910 |
| 9,080,542 B2 | 7/2015 | Nefcy et al. | |
| 9,108,633 B1 * | 8/2015 | Atluri ..................... | B60L 58/12 |
| 9,696,234 B2 | 7/2017 | Tseng et al. | |
| 9,828,924 B1 * | 11/2017 | Connolly .............. | F02D 41/062 |
| 10,023,177 B2 | 7/2018 | Makled et al. | |
| 10,384,665 B1 * | 8/2019 | Boyko .................. | B60W 20/00 |
| 10,711,756 B1 | 7/2020 | Pettersson et al. | |

(Continued)

FOREIGN PATENT DOCUMENTS

| | | | |
|---|---|---|---|
| JP | 2004339943 A | * | 12/2004 |
| JP | 2007076646 A | * | 3/2007 |

(Continued)

*Primary Examiner* — John M Zaleskas
(74) *Attorney, Agent, or Firm* — David Kelley; McCoy Russell LLP (57) ABSTRACT

Systems and methods for starting an engine that may be started via two different electric machines are described. In one example, the method reserves an amount of torque that is based on a torque capability of a belt integrated starter/generator and the engine is started with the reserved torque if engine starting torque is greater than a torque capability of the belt integrated starter/generator.

14 Claims, 4 Drawing Sheets

(56) References Cited

U.S. PATENT DOCUMENTS

| | | | | |
|---|---|---|---|---|
| 10,859,055 B1* | 12/2020 | Doering | F02N 11/0862 |
| 10,961,970 B1* | 3/2021 | Lew | F01N 3/208 |
| 2004/0149247 A1* | 8/2004 | Kataoka | F02N 99/006 |
| | | | 123/179.4 |
| 2009/0212569 A1* | 8/2009 | Bauer | F02N 11/006 |
| | | | 290/47 |
| 2011/0118078 A1* | 5/2011 | Kraska | F02N 11/08 |
| | | | 180/65.265 |
| 2011/0301797 A1* | 12/2011 | Steuernagel | B60W 10/06 |
| | | | 903/902 |
| 2012/0083385 A1* | 4/2012 | Smith | B60W 20/00 |
| | | | 180/65.265 |
| 2012/0083952 A1* | 4/2012 | Smith | B60K 6/442 |
| | | | 180/65.265 |
| 2013/0160731 A1* | 6/2013 | Poeltenstein | F02N 11/087 |
| | | | 123/179.1 |
| 2014/0296025 A1* | 10/2014 | Fushiki | B60W 10/08 |
| | | | 180/65.265 |
| 2014/0324263 A1* | 10/2014 | Tabata | B60K 6/442 |
| | | | 180/65.265 |
| 2014/0373676 A1* | 12/2014 | Nefcy | B60W 10/08 |
| | | | 74/7 C |
| 2015/0025724 A1* | 1/2015 | Yamazaki | B60W 10/02 |
| | | | 701/22 |
| 2015/0112524 A1* | 4/2015 | Wang | B60W 20/10 |
| | | | 180/65.265 |
| 2015/0226171 A1* | 8/2015 | Kees | B60W 10/26 |
| | | | 290/31 |
| 2015/0360683 A1* | 12/2015 | Gibson | B60W 30/20 |
| | | | 903/903 |
| 2016/0032880 A1* | 2/2016 | Lovett | F02N 5/04 |
| | | | 903/903 |
| 2016/0368486 A1* | 12/2016 | Thompson | B60W 10/06 |
| 2017/0015308 A1* | 1/2017 | Ortmann | B60W 10/02 |
| 2017/0120896 A1* | 5/2017 | Thompson | B60K 6/48 |
| 2017/0259808 A1* | 9/2017 | Makled | B60W 10/02 |
| 2017/0259810 A1* | 9/2017 | Zhang | B60W 20/10 |
| 2018/0050686 A1* | 2/2018 | Atluri | B60K 6/387 |
| 2018/0056972 A1* | 3/2018 | Kim | B60W 20/00 |
| 2018/0058406 A1* | 3/2018 | Fujita | F02N 11/006 |
| 2018/0135583 A1* | 5/2018 | Mizuno | F02N 11/0851 |
| 2018/0163686 A1* | 6/2018 | Kim | B60W 30/192 |
| 2018/0208179 A1* | 7/2018 | Johri | F02N 11/006 |
| 2018/0306157 A1* | 10/2018 | Lee | B60W 30/1843 |
| 2018/0340503 A1* | 11/2018 | Kim | F02N 11/0866 |
| 2019/0143961 A1* | 5/2019 | Meyer | B60W 10/02 |
| | | | 701/22 |
| 2019/0153987 A1* | 5/2019 | Connolly | B60W 20/40 |
| 2019/0184970 A1* | 6/2019 | Kim | F02N 19/005 |
| 2019/0315339 A1* | 10/2019 | Okumura | F02N 11/04 |
| 2019/0376483 A1* | 12/2019 | Khafagy | F02N 15/06 |
| 2020/0116114 A1* | 4/2020 | Koeppl | F02N 11/0859 |
| 2020/0164864 A1* | 5/2020 | Palejiya | B60W 10/08 |
| 2020/0189561 A1* | 6/2020 | Mao | B60W 20/50 |
| 2020/0240382 A1* | 7/2020 | Pettersson | F02N 11/06 |
| 2021/0300316 A1* | 9/2021 | Doering | B60W 30/192 |
| 2022/0065211 A1* | 3/2022 | Asano | F02N 11/108 |
| 2022/0097677 A1* | 3/2022 | Meyer | B60W 10/08 |
| 2022/0213856 A1* | 7/2022 | Baxendale | F02N 15/022 |

FOREIGN PATENT DOCUMENTS

| | | | | |
|---|---|---|---|---|
| JP | 2012111267 A | * | 6/2012 | F02N 11/006 |
| JP | 2018105200 A | * | 7/2018 | |
| KR | 20180068463 A | * | 6/2018 | F02N 11/006 |

* cited by examiner

METHODS AND SYSTEM FOR STARTING AN ENGINE

FIELD

The present description relates to methods and a system for starting an engine that includes two engine starting devices.

BACKGROUND AND SUMMARY

An engine may be stopped (e.g., ceases rotating and combustion) and started while a vehicle is operated. The engine may be stopped to conserve fuel while an electric machine propels a vehicle. The engine may stop at a crankshaft position where it is comparatively easy to rotate the engine via an electric machine to start the engine. For example, a six cylinder engine may stop at 60° of crankshaft rotation before top-dead-center compression stroke of cylinder number one, where the engine's pistons are half way through their respective strokes. Alternatively, the engine may stop near top-dead-center compression stroke where it is comparatively more difficult to rotate the engine due to air that is compressed in the engine's cylinders and mechanical friction. The engine starting torque may be high enough that belt integrated starter/generator (BISG) torque is insufficient to start the engine. However, starting the engine via the BISG may be efficient and the BISG may generate lower noise and vibrations than other engine starting systems. Therefore, it may be desirable to provide a way of starting the engine that uses torque that may be generated via the BISG, yet is sufficient to start the engine.

The inventors herein have recognized the above-mentioned issues and have developed a method for starting an engine, comprising: estimating an amount of torque to start an engine via a controller according to a position at which the engine is stopped; estimating a torque capability of a belt integrated starter generator (BISG); starting the engine via an assist torque that is based on the estimated amount of torque to start the engine and the torque capability of the BISG.

By starting the engine with BISG torque and assisting torque, it may be possible to provide the technical result of starting the engine with the BISG to reduce engine starting noise and generating sufficient torque to start the engine. In particular, a driveline disconnect clutch and an ISG positioned downstream of the driveline disconnect clutch may be operated to augment the BISG torque so that an engine may be started. Much of the time, torque provided solely via the BISG may be sufficient to start the engine. However, during times when BISG torque is insufficient to start the engine, all BISG torque capability may be delivered to the engine and the to driveline disconnect clutch and the ISG may provide a remainder of torque to start the engine that cannot be provided by the BISG to start the engine at a particular time. Thus, a majority of torque to start the engine may be provided via the BISG so that engine starting noise and vibration may be low.

The present description may provide several advantages. In particular, the approach may improve a possibility of starting an engine. Further, the approach may increase an amount of BISG torque that may be provided during an engine start to reduce engine starting noise and vibration. Further still, the approach may reduce system cost since a BISG does not have to be oversized to increase the possibility of engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to starting an engine. The engine may be started by being rotated solely via a belt integrated starter/generator (BISG). However, if the BISG's torque generating capability is reduced because the BISG is operating at a higher temperature, the BISG may be assisted starting the engine via a driveline disconnect clutch and an integrated starter/generator (ISG). The engine may be of the type shown in FIG. 1. The engine may be included in a vehicle of the type shown in FIG. 2. The engine may be started according to the method of FIG. 4 as shown in the engine starting sequence of FIG. 3.

Figure 1:
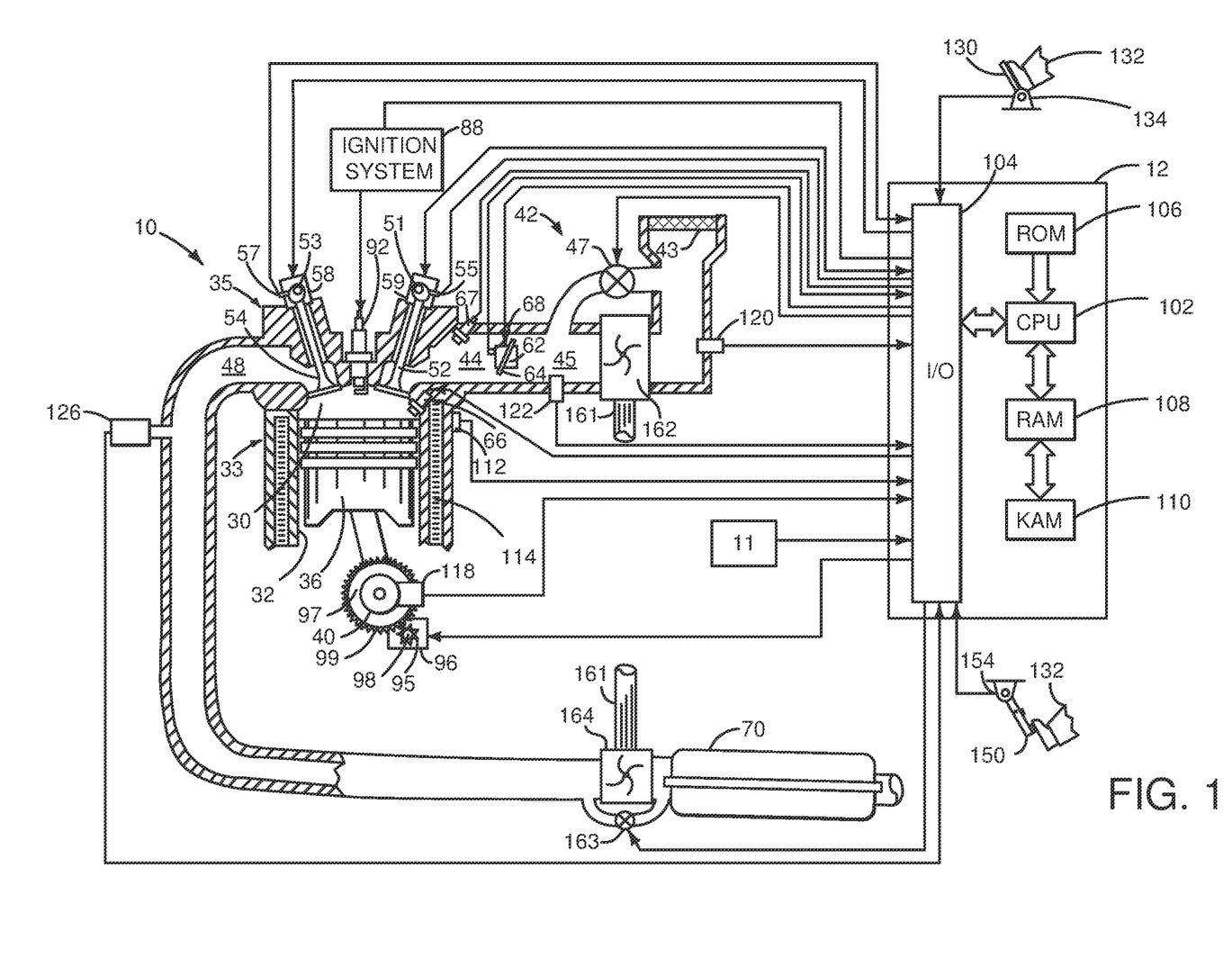
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
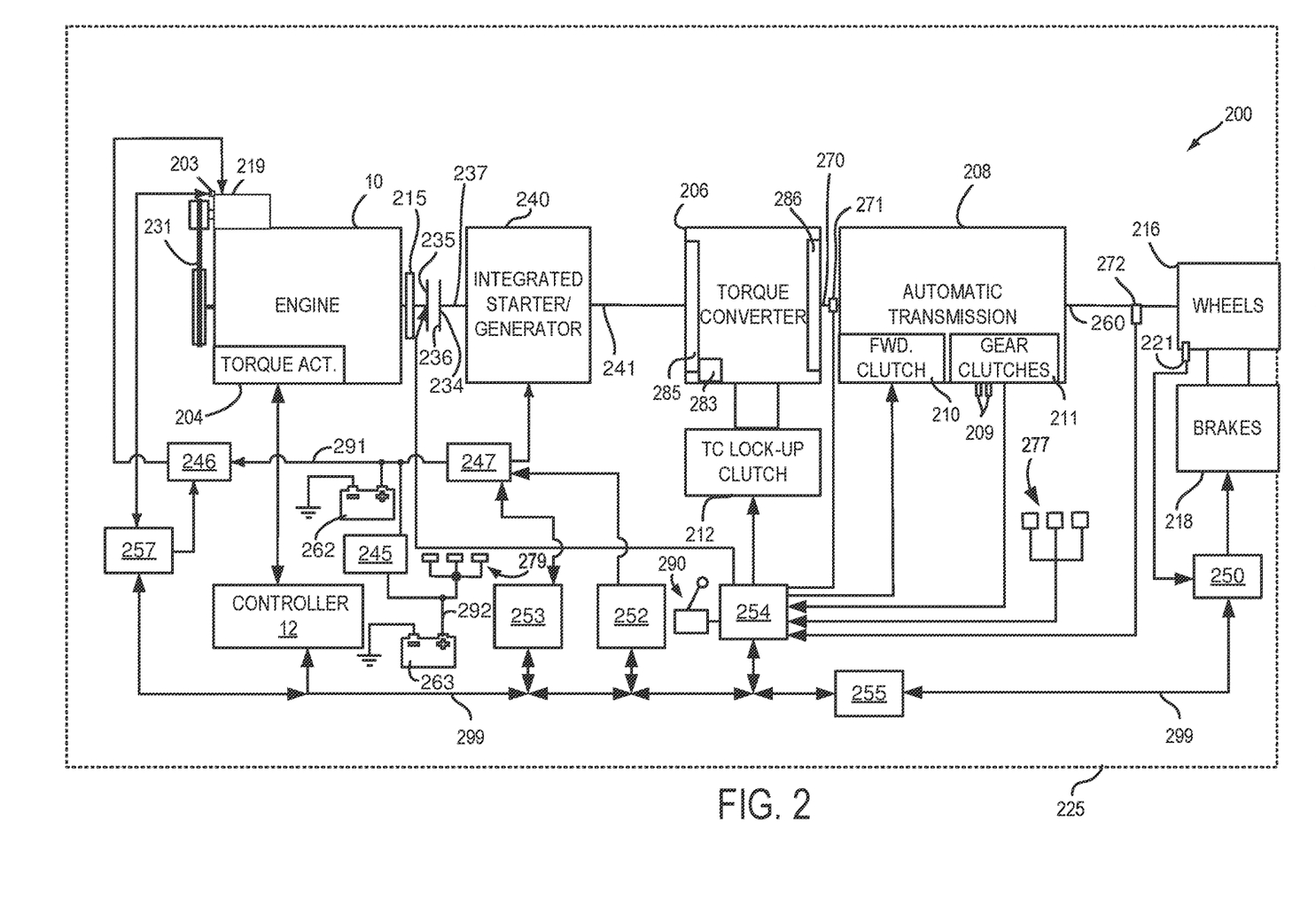
FIG. 2 is a schematic diagram of a vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290

(e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; a belt integrated starter/generator (BISG) coupled to the engine; an integrated starter/generator (ISG); a driveline disconnect clutch positioned in a driveline between the ISG and the engine; and a controller including executable instructions stored in non-transitory memory that cause the controller to start the engine via rotating the engine solely via the BISG in response to an estimated engine starting torque being less than or equal to a torque capability of the BISG. The system further comprises additional instructions to estimate the torque capability of the BISG based on a temperature of the BISG. The system further comprises additional instructions to estimate an assist torque amount based on the engine starting torque and the torque capability of the BISG. The system further comprises additional instructions to start the engine via rotating the engine via the BISG and the ISG in response to the estimated engine starting torque being greater than the torque capability of the ISG.

In some examples, the system further comprises additional instructions to estimate an engine starting assist torque, where the assist torque is equal to the estimated engine starting torque minus the torque capability of the ISG. The system further comprises additional instructions to adjust a torque of the driveline disconnect clutch to a value of the engine start assist torque. The system further comprises additional instructions to stroke the driveline disconnect clutch before starting the engine via the ISG. The system further comprises additional instructions to delay torque output of the BISG in response to engine starting assist torque being provided via the ISG.

Figure 3:
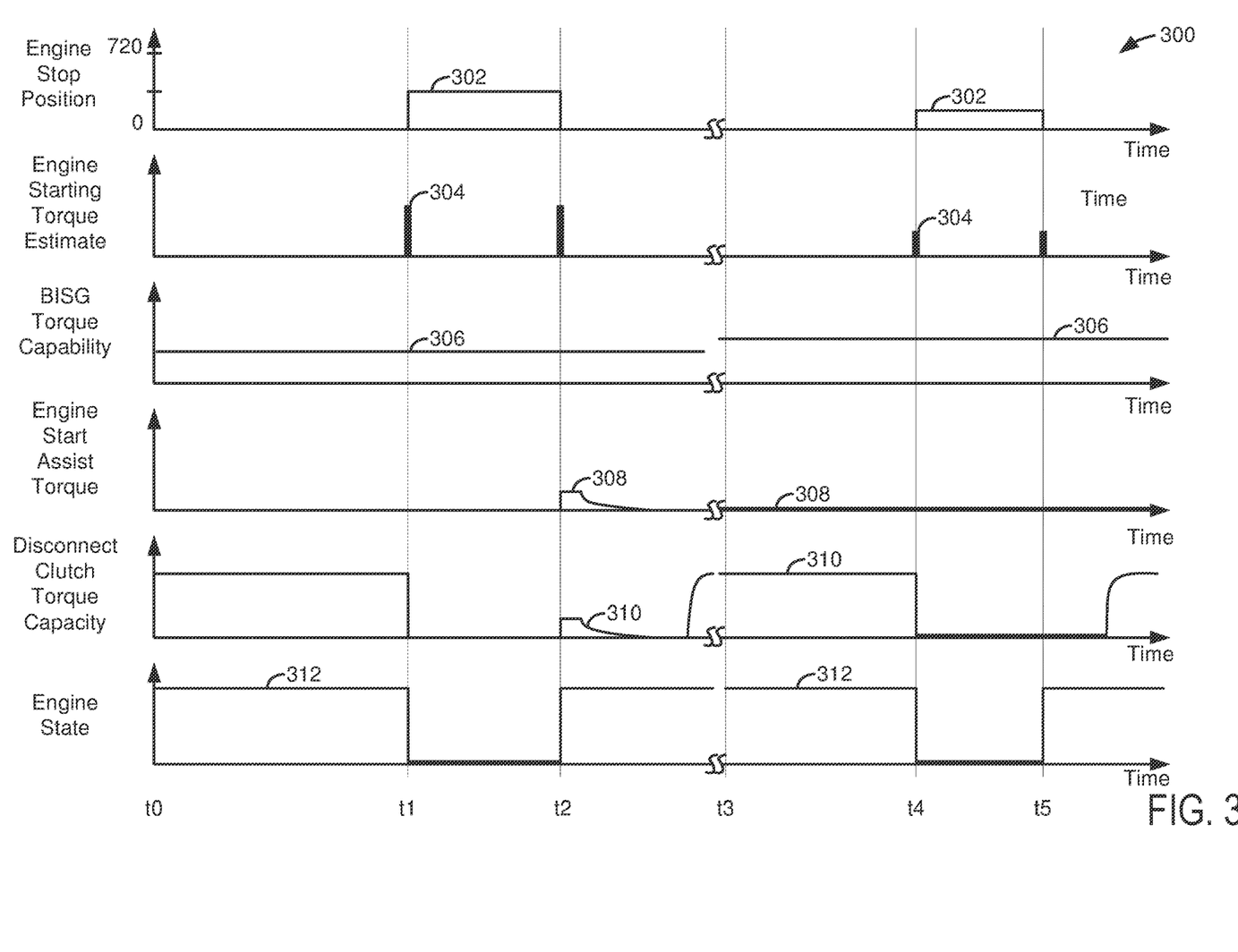
FIG. 3 shows example engine starting sequences according to the method of FIG. 4.
Figure 4:
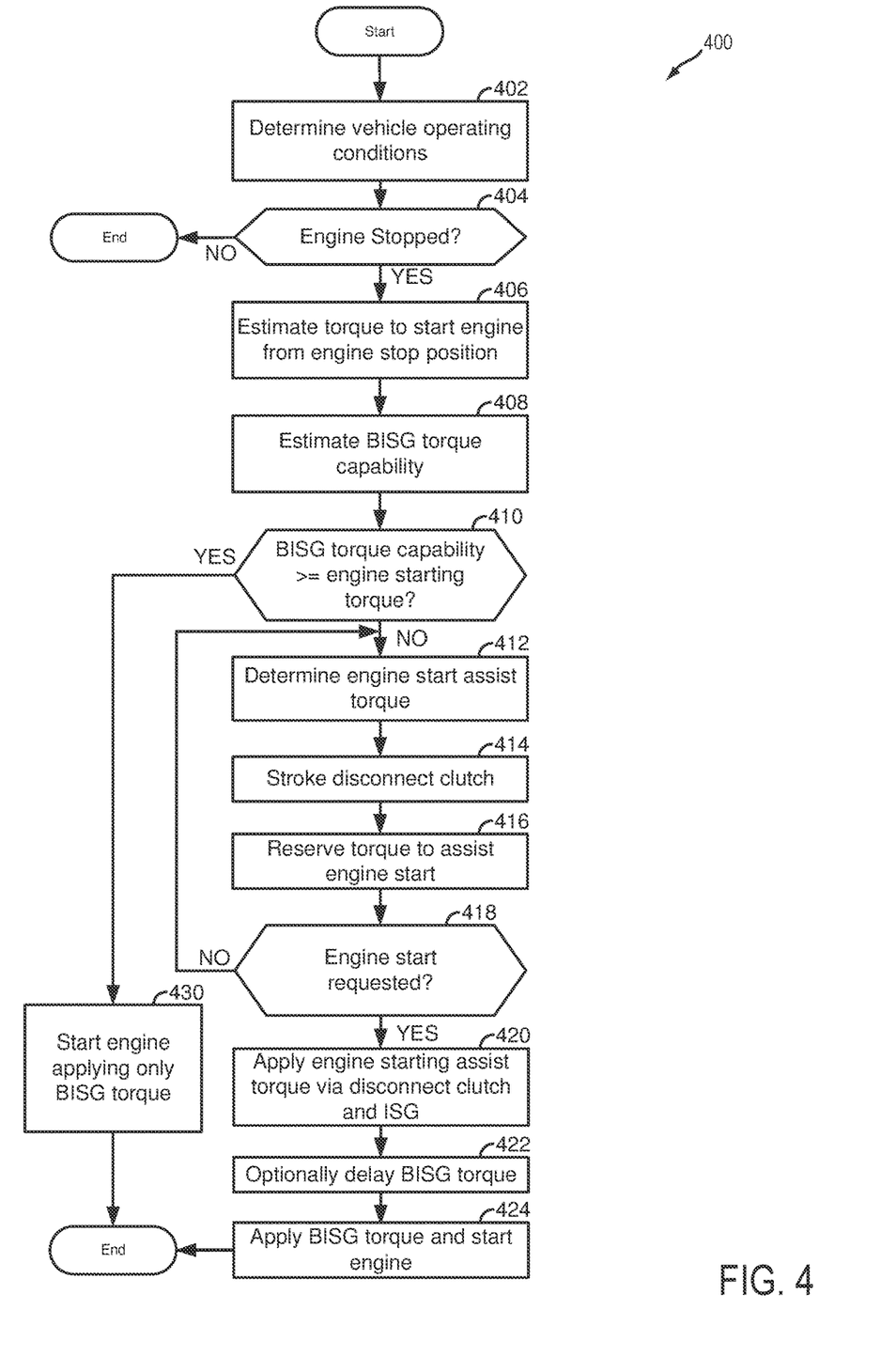
FIG. 4 shows an example method for starting an engine of the type shown in FIG. 1.

Referring now to FIG. 3, an example prophetic engine operating sequence according to the method of FIG. 4 is shown. The example sequence may be provided by the system of FIGS. 1 and 2 in cooperation with the method of FIG. 4. The plots are aligned in time and occur at a same time. The vertical lines at t0-t5 indicate times of particular interest. FIG. 3 shows two different automatic engine starts. The double SS along the horizontal axes represents a break in time and the break may be long or short in duration.

The first plot from the top of FIG. 3 is a plot of engine stopping position (e.g., the crankshaft angle where the engine stops rotating) versus time. The vertical axis represents engine crankshaft position and engine crankshaft position increases in the direction of the vertical axis arrow. The engine crankshaft position is referenced to top-dead-center compression stroke of cylinder number one and the crankshaft position is illustrated for one engine cycle (e.g., 720 crankshaft degrees for a four stroke engine). The horizontal axis represents time and the time increases from the left side of the figure to the right side of the figure. Trace 302 represents the engine stopping position.

The second plot from the top of FIG. 3 is a plot of an estimated engine starting torque (e.g., an estimate of a maximum amount of torque needed to cause the engine to rotate at a desired speed (250 RPM) when the engine is rotated via one or more electric machines without combustion torque) versus time. The vertical axis represents engine starting torque and engine starting torque increases in the direction of the vertical axis arrow. The horizontal axis represents time and the time increases from the left side of the figure to the right side of the figure. Trace 304 represents the engine starting torque.

The third plot from the top of FIG. 3 is a plot of belt integrated starter/generator torque capability (e.g., a maximum amount of torque the BISG may output at present operating conditions) versus time. The vertical axis represents BISG torque capability and the BISG torque capability increases in the direction of the vertical axis arrow. The horizontal axis represents time and the time increases from the left side of the figure to the right side of the figure. Trace 306 represents the BISG torque capability. BISG torque capability is zero at the level of the horizontal axis.

The fourth plot from the top of FIG. 3 is a plot of engine starting assistance torque (e.g., torque that is combined with BISG torque to start the engine) versus time. The vertical axis represents the engine starting assistance torque and the engine starting assistance torque increases in the direction of the vertical axis arrow. Engine starting assistance torque is zero at the level of the horizontal axis. The horizontal axis represents time and the time increases from the left side of the figure to the right side of the figure. Trace 308 represents the engine starting assistance torque.

The fifth plot from the top of FIG. 3 is a plot of driveline disconnect clutch torque capacity (e.g., an amount of torque that may be transferred from one side of the driveline disconnect clutch to the other side of the driveline disconnect clutch) versus time. The vertical axis represents driveline disconnect clutch torque capacity and driveline disconnect clutch torque capacity increases in the direction of the vertical axis arrow. Driveline disconnect clutch torque capacity is zero at the level of the horizontal axis. The horizontal axis represents time and the time increases from the left side of the figure to the right side of the figure. Trace 310 represents the driveline disconnect clutch torque capacity.

The sixth plot from the top of FIG. 3 is a plot of engine operating state and the engine is rotating when trace 312 is at a higher level near the vertical axis arrow. The engine is not rotating and combusting fuel when trace 312 is at the level of the horizontal axis. The horizontal axis represents time and the time increases from the left side of the figure to the right side of the figure. Trace 312 represents the engine operating state.

At time t0, the engine is operating and the engine stop position and engine starting torque estimate are unknown. The BISG torque capability is a lower middle level and the engine start assist torque is zero. The disconnect clutch torque capacity is high.

At time t1, the engine stops rotating at 360 crankshaft degrees after top-dead-center compression stroke of cylinder number one. Cylinder number five is near (e.g., within 10 crankshaft degrees) top-dead-center compression stroke, so the engine starting torque is estimated high due to compression torque and friction torque. The BISG torque capacity is less than the engine starting torque. The engine starting assist torque is presently zero and the driveline disconnect clutch is opened when the engine speed is zero such that the driveline disconnect clutch torque capacity is reduced to zero.

At time t2, the engine begins rotating as part of the engine restart sequence. The engine is rotated using the torque output of the BISG and torque output of the ISG. The torque output of the ISG is provided to the engine via at least partially closing the driveline disconnect clutch to increase the driveline disconnect clutch torque capacity. The driveline disconnect clutch torque capacity is raised to equal the engine starting torque minus the BISG torque capability. The BISG torque output (not shown) is the BISG torque capability. The engine state changes from stopped to rotating.

After time t2 and before time t3, the engine starting assist torque is reduced in response to the engine starting and combustion within the engine generating torque (not shown). The driveline disconnect clutch torque capacity is reduced and then it is increased when the engine speed matches the ISG speed (not shown). The BISG torque capability is unchanged and the engine continues to rotate. A break in the sequence occurs between time t2 and time t3.

At time t3, the engine is operating and the engine stop position and engine starting torque estimate are unknown. The BISG torque capability is a middle level and the engine start assist torque is zero. The disconnect clutch torque capacity is high.

At time t4, the engine stops rotating at about 60 crankshaft degrees after top-dead-center compression stroke of cylinder number one. None of the engine's cylinders are near top-dead-center compression stroke, so the engine starting torque is estimated lower than at time t1. The BISG torque capacity is greater than the engine starting torque. The engine starting assist torque is presently zero and the driveline disconnect clutch is opened when the engine speed is zero such that the driveline disconnect clutch torque capacity is reduced to zero.

At time t5, the engine begins rotating as part of the engine restart sequence. The engine is rotated using solely the torque output of the BISG. The BISG is operated without assistance from the ISG to start the engine. The driveline disconnect clutch torque capacity is zero since the ISG is not used to start the engine. As a result, engine starting noise may be lower than engine starting noise at time t2. The engine state changes from stopped to rotating.

Thus, the BISG may start the engine with or without assistance from the ISG. The BISG may start without assistance from the ISG when the BISG torque capability exceeds the engine starting torque. However, if the engine starting torque is greater than the BISG torque capability, the ISG may provide an assistance torque to start the engine via at least partially closing the driveline disconnect clutch.

Turning now to FIG. 4, a flowchart of a method for operating an engine is shown. In particular, the method of FIG. 4 may be applied to select one or more engine starting devices to start a stopped engine. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, BISG temperature, Method 400 proceeds to 404.

At 404, method 400 judges if the engine has stopped rotating. Method 400 may judge that the engine is stopped rotating based on output of an engine position sensor. For example, if output of an engine position sensor fails to change within a threshold amount of time, method 400 may judge that the engine is stopped. If method 400 judges that the engine is stopped, the answer is yes and method 400 proceeds to 406. Otherwise, the answer is no and method 400 proceeds to exit.

At 406, method 400 estimates an amount of torque to start an engine. In one example, method 400 estimates the amount of torque to start the engine via a look-up table or function that is stored in controller memory and that outputs an engine starting torque. The table or function may be referenced via engine stop crankshaft position (e.g., the position at which the engine is stopped), engine temperature, and barometric pressure. Values stored in the table may be empirically determined via rotating the engine beginning at different engine stop positions and temperatures while monitoring the torque to turn the engine. Method 400 proceeds to 408 after the engine starting torque is determined.

At 408, method 400 estimates a torque capability of the BISG. In one example, method 400 estimates the torque capability of the BISG via a look-up table or function that is stored in controller memory and that outputs a BISG torque capability value. The table or function may be referenced via BISG speed, BISG temperature, and battery state of charge (SOC). Values stored in the table may be empirically determined via commanding a maximum BISG torque that does not degrade the BISG and measuring BISG torque at different BISG speeds, different BISG temperatures, and SOC values. Method 400 proceeds to 410 after the BISG torque capability is determined.

At 410, method 400 judges if the BISG torque capability is greater than or equal to the engine starting torque determined at 406. If method 400 judges that the BISG torque capability is greater than or equal to the engine starting torque determined at 406, then the answer is yes and method 400 proceeds to 430. Otherwise, the answer is no and method 400 proceeds to 412.

At 430, method 400 commands the BISG to rotate the engine. The BISG is the only electric machine that rotates the engine during an engine start at the present step. In one example, the BISG may be commanded to provide the engine starting torque that was determined at 406. Method 400 proceeds to exit.

At 412, method 400 determines an engine starting assistance torque. In one example, the engine start assist torque may be determined via the following equation:

$$EngStasst = EngSttor - BISGtorcap$$

where EngStasst is a variable that represents the engine starting assistance torque, EngSttor is the engine starting torque as determined at 406, and BISGtorcap is the BISG torque capability as determined at 408. Method 400 proceeds to 414.

At 414, method 400 optionally strokes the driveline disconnect clutch from a fully open state to a partially closed state. The driveline disconnect clutch is stroked by reducing clearance between clutch plates while transferring less than a threshold amount of torque via the driveline disconnect clutch. Stroking the driveline disconnect clutch may allow ISG to assist in engine starting sooner than if the driveline disconnect clutch was not stroked. Method 400 proceeds to 416.

At 416, method 400 reserves a portion of the total amount of torque that may be produced via the ISG for starting the engine. The amount of torque reserved for starting the engine is equal to the engine starting assistance torque. For example, if the ISG has a capability to output 100 Newton-meters (Nm) of torque and the engine starting assistance torque is 20 Nm, then the ISG may deliver 80 Nm of torque to the driveline to propel the vehicle and the 20 Nm is held back in reserve to start the engine without the reserved torque being delivered to the driveline. Method 400 proceeds to 418.

At 418, method 400 judges if an engine start is requested. An engine start may be requested via operator input to a key switch, pushbutton, or similar device that is dedicated as an input for engine starting and/or stopping. Alternatively, an engine start request may be generated via the controller responding to vehicle operating conditions. For example, an engine start may be requested via the controller if driver demand is greater than a threshold. If method 400 judges that an engine start is requested, the answer is yes and method 400 proceeds to 420. Otherwise, the answer is no and method 400 returns to 412.

At 420, method 400 adjusts the driveline disconnect torque capacity (e.g., an amount of torque that the driveline disconnect clutch may transfer from a first side of the driveline disconnect clutch to a second side of the driveline disconnect clutch) to the amount of the engine starting assistance torque. In addition, method 400 increases torque output of the ISG by the amount of the engine starting assistance torque. For example, if the engine starting assistance torque is 20 Nm, the driveline disconnect clutch torque capacity is increased to a value of 20 Nm and the ISG output torque is increased by 20 Nm. The increased driveline disconnect clutch torque capacity and increased ISG torque output allow the engine to be rotated via the ISG and the BISG. If the BISG torque capability is zero, the ISG may provide all torque applied to rotate the engine. Method 400 proceeds to 422.

At 422, method 400 may optionally delays the BISG torque output for starting the engine. The BISG torque may be delayed for a predetermined amount of time that may be equal to the amount of time it takes for the driveline disconnect clutch capacity to be increased to the engine starting assistance torque. Method 400 proceeds to 424.

At 424, method 400 increases output torque of the BISG and the engine is rotated via the BISG torque and the engine starting assist torque that is provided by the ISG. Method 400 may also supply spark and fuel to start the engine. Method 400 proceeds to exit after the engine is started.

In this way, a fully torque capability of a BISG may be applied to start a stopped engine. If engine starting torque is greater than the torque capability of the BISG, the ISG may provide engine start assist torque so that the engine may be started. Consequently, noise and vibration that may be associated with engine starting may be reduced.

Thus, the method of FIG. 4 provides for a method for starting an engine, comprising: estimating an amount of torque to start an engine via a controller according to a position at which the engine is stopped; estimating a torque capability of a belt integrated starter generator (BISG); starting the engine via an assist torque that is based on the estimated amount of torque to start the engine and the torque capability of the BISG. The method includes where the assist torque is equal to the estimated amount of torque to start the engine minus the torque capability of the BISG. The method includes where the torque capability of the BISG is based on a BISG temperature. The method includes where the assist torque is provided via partially closing a driveline disconnect clutch. The method includes where partially closing the driveline disconnect clutch includes increasing a torque capacity of the driveline disconnect clutch to a level of the assist torque. The method includes where the assist torque is further provided via increasing torque output of an integrated starter generator. The method includes where torque output of the integrated starter generator is increased in an amount of the assist torque.

The method of FIG. 4 also provides for a method for operating an engine, comprising: reserving an amount of integrated starter/generator (ISG) torque for starting an engine via a controller, the amount of ISG torque being equal to an amount of torque to start an engine minus a torque capability of a belt integrated starter/generator (BISG); and propelling a vehicle via the ISG while reserving the amount of ISG torque. The method further comprises starting an engine via the (ISG) and a belt integrated starter/generator (BISG) via a controller in response to a torque capability of the BISG being less than an engine starting torque, the engine starting torque based on an engine stop position. The method further comprises closing a driveline disconnect clutch in response to an engine start request. The method further comprises delaying torque from the BISG to start the engine. The method further comprises adjusting a torque capacity of the driveline disconnect clutch to the amount of ISG torque that is reserved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine, comprising:
estimating an amount of torque to start the engine via a controller according to a position at which the engine is stopped;
estimating a torque capability of a belt integrated starter generator (BISG);
starting the engine via an assist torque that is based on the estimated amount of torque to start the engine and the torque capability of the BISG, where the assist torque is equal to the estimated amount of torque to start the engine minus the torque capability of the BISG.

2. The method of claim 1, where the torque capability of the BISG is based on a BISG temperature.

3. The method of claim 2, where the assist torque is provided via partially closing a driveline disconnect clutch.

4. The method of claim 3, where partially closing the driveline disconnect clutch includes increasing a torque capacity of the driveline disconnect clutch to a level of the assist torque.

5. The method of claim 4, where the assist torque is further provided via increasing torque output of an integrated starter generator.

6. A system, comprising:
an engine;
a belt integrated starter/generator (BISG) coupled to the engine;
an integrated starter/generator (ISG);
a driveline disconnect clutch positioned in a driveline between the ISG and the engine; and
a controller including executable instructions stored in non-transitory memory that cause the controller to start the engine via rotating the engine solely via the BISG in response to an estimated engine starting torque being less than or equal to a torque capability of the BISG, instructions to estimate the torque capability of the BISG based on a temperature of the BISG, instructions to estimate an assist torque amount based on the estimated engine starting torque and the torque capability of the BISG, and instructions to start the engine via rotating the engine via the BISG and the ISG in response to the estimated engine starting torque being greater than the torque capability of the BISG.

7. The system of claim 6, where the engine starting assist torque is equal to the estimated engine starting torque minus the torque capability of the BISG.

8. The system of claim 7, further comprising additional instructions to adjust a torque of the driveline disconnect clutch to a value of the engine starting assist torque.

9. The system of claim 8, further comprising additional instructions to stroke the driveline disconnect clutch before starting the engine via the ISG.

10. A method for operating an engine, comprising:
reserving an amount of integrated starter/generator (ISG) torque for starting the engine via a controller, the amount of ISG torque for starting the engine being equal to an amount of torque to start the engine minus a torque capability of a belt integrated starter/generator (BISG); and
propelling a vehicle via an integrated starter/generator while reserving the amount of ISG torque.

11. The method of claim 10, further comprising starting the engine via the integrated starter/generator and the BISG via the controller in response to the torque capability of the BISG being less than the amount of torque to start the engine, the amount of torque to start the engine based on an engine stop position.

12. The method of claim 11, further comprising closing a driveline disconnect clutch in response to an engine start request.

13. The method of claim 11, further comprising delaying torque from the BISG to start the engine.

14. The method of claim 13, further comprising adjusting a torque capacity of the driveline disconnect clutch to the amount of ISG torque that is reserved.

* * * * *